United States Patent
Hienzsch

(10) Patent No.: US 7,401,379 B2
(45) Date of Patent: Jul. 22, 2008

(54) WINDSHIELD WIPER SYSTEM FOR A MOTOR VEHICLE INCLUDING A HEATING MECHANISM

(75) Inventor: Dieter Hienzsch, Garmisch Partenkirchen (DE)

(73) Assignee: Kaessbohrer Gelaendefahrzeug AG, Laupheim (DE)

( * ) Notice: Subject to any disclaimer, the term of this patent is extended or adjusted under 35 U.S.C. 154(b) by 287 days.

(21) Appl. No.: 11/061,133

(22) Filed: Feb. 18, 2005

(65) Prior Publication Data

US 2005/0183227 A1 Aug. 25, 2005

(30) Foreign Application Priority Data

Feb. 19, 2004 (DE) ............ 10 2004 009 911

(51) Int. Cl.
*B60S 1/38* (2006.01)
(52) U.S. Cl. ................ 15/250.07; 15/250.05
(58) Field of Classification Search .......... 15/250.05, 15/205.07, 250.08, 250.09, 250.04
See application file for complete search history.

(56) References Cited

U.S. PATENT DOCUMENTS

| | | | | |
|---|---|---|---|---|
| 1,691,842 A | * | 11/1928 | Damush | 15/250.04 |
| 2,034,880 A | * | 3/1936 | Sackett | 15/250.07 |
| 2,255,393 A | * | 9/1941 | Osborn | 15/250.07 |
| 2,322,312 A | * | 6/1943 | Osborn | 15/250.07 |
| 2,443,849 A | * | 6/1948 | Childs | 15/250.07 |
| 2,786,224 A | * | 3/1957 | Dembosky | 15/250.08 |
| 3,074,096 A | * | 1/1963 | Van Hess | 15/250.07 |
| 3,418,676 A | * | 12/1968 | Byczkowski et al. | 15/250.04 |
| 3,427,675 A | | 2/1969 | Tibbet | |
| 3,574,881 A | | 4/1971 | Temple | |
| 5,676,868 A | * | 10/1997 | Simmons | 219/202 |
| 5,881,428 A | | 3/1999 | Simmons | |
| 6,754,933 B1 | | 6/2004 | Pettersson | |

FOREIGN PATENT DOCUMENTS

| | | |
|---|---|---|
| CA | 2 357 337 A1 | 3/2002 |
| DE | 2164932 A1 | 7/1973 |
| DE | 3134083 A1 | 3/1983 |
| DE | 3323004 C2 | 1/1985 |
| DE | 19723900 A1 | 12/1998 |

OTHER PUBLICATIONS

Germany Office Action dated Feb. 1, 2005 (3 pages).
European Patent Search Report dated Aug. 4, 2005 (4 pages).
German Patent Office Official Action dated Feb. 9, 2007 (4 pages).

* cited by examiner

*Primary Examiner*—Gary K Graham
(74) *Attorney, Agent, or Firm*—Flynn, Thiel, Boutell & Tanis, P.C.

(57) ABSTRACT

A windshield-wiper system for a motor vehicle with a wiper-blade carrier, a wiper blade held on the wiper-blade carrier, which wiper blade has an elastically flexible wiper element, includes a heating mechanism for the wiper blade. The wiper-blade carrier has at least one wall section which conducts heat in sections, and which is operatively connected heat-conductingly or heat-transmittingly to the wiper element and/or the wiper blade. At least one cooling-medium line of a cooling-medium cycle of a drive motor of the motor vehicle, which cooling-medium line consists of a heat-conducting material, is laid along the wall section.

12 Claims, 2 Drawing Sheets

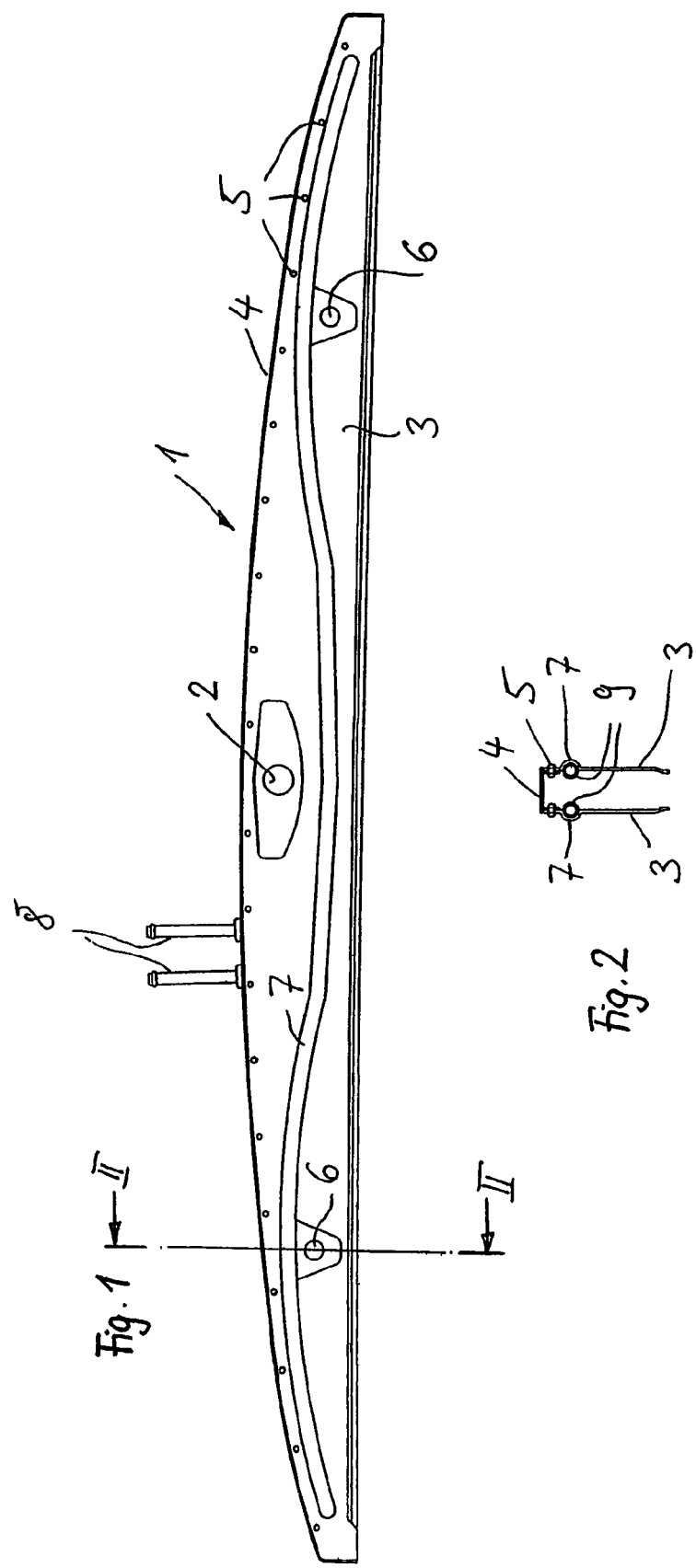

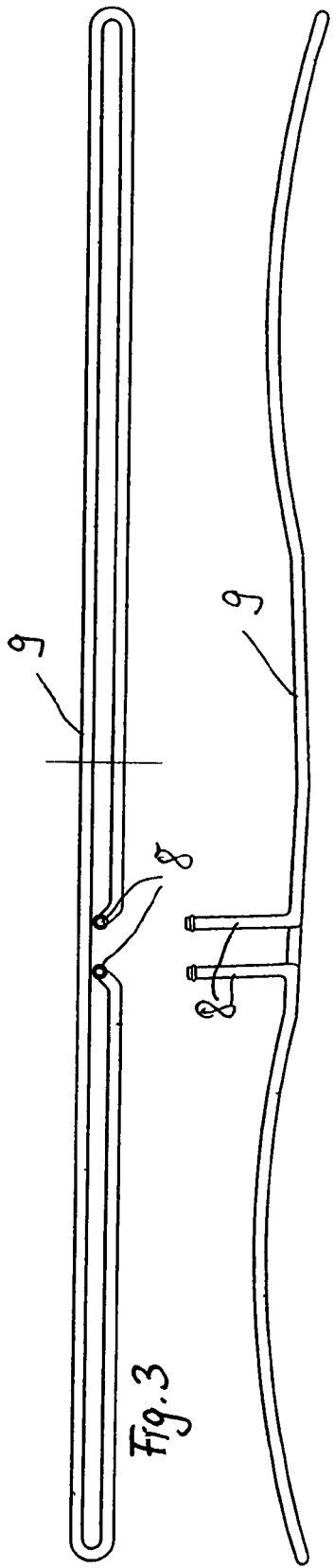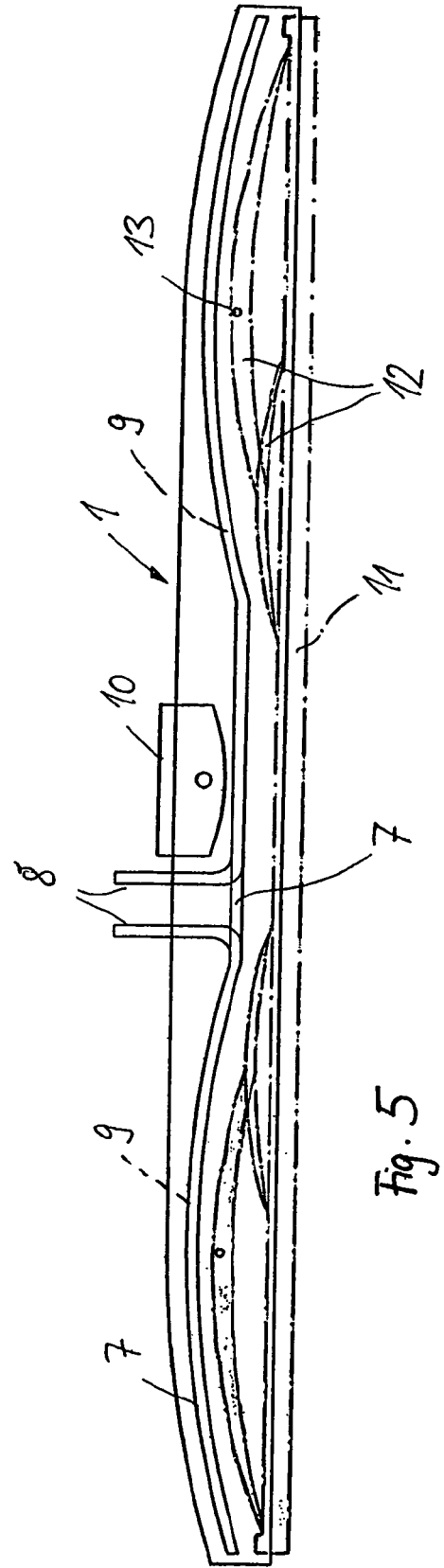

WINDSHIELD WIPER SYSTEM FOR A MOTOR VEHICLE INCLUDING A HEATING MECHANISM

CROSS REFERENCE TO RELATED APPLICATION

The following disclosure is based on German Patent Application No. 10 2004 009911.1 filed on Feb. 19, 2004, which is incorporated into this application by reference.

FIELD OF THE INVENTION

The invention relates to a windshield-wiper system for a motor vehicle with a wiper-blade carrier, comprising a wiper blade held on the wiper-blade carrier, which wiper blade has an elastically flexible wiper element, and comprising a heating mechanism for the wiper blade.

BACKGROUND OF THE INVENTION

A windshield-wiper system is known from DE 33 23 004 C2. The known windshield-wiper system has a wiper arm, which has a wiper blade, which is hinged approximately centrally. A washing-fluid channel is integrated into the wiper arm. Several heating-medium channels extend parallel to the washing-fluid channel, which heating-medium channels are connected heat-conductingly to the washing-fluid channel. This prevents freezing of the washing fluid during low outside temperatures.

A windshield-wiper system is known from DT 2 164 932, where a wiper-rubber profile of the wiper blade has a longitudinally extending, electric heat conductor. This is supposed to prevent freezing of the wiper-rubber profile in snow and ice such that it can no longer carry out an elastic wiping activity on the windshield.

SUMMARY OF THE INVENTION

The purpose of the invention is to create a windshield-wiper system of the above-mentioned type, which maintains even during very frosty outside influences a satisfactory windshield-wiper operation.

This purpose is attained by the windshield-wiper carrier having at least one wall section, which conducts heat at least in sections, and which flanks the wiper element and/or the wiper blade at least in sections, and by at least one heating-medium line consisting of a heat-conducting material being laid along the wall section. The elastically flexible wiper element is heated in the inventive solution and is thus held in an elastic, constant state of the wiper operation. The at least one wall section is in the inventive solution heat-conductingly or heat-transmittingly operatively connected to the wiper blade and/or the wiper element, and thus maintains in particular the wiper element at a temperature, which prevents the accumulation of snow or ice and maintains the elasticity of the material of the wiper element. The heating-medium line is preferably formed by a cooling-medium line of a cooling-medium cycle of a drive motor of the motor vehicle. Due to the fact that the heating-medium line is laid along the wall section of the wiper-blade carrier, the wiper-blade carrier functions as a heat exchanger or heat transmitter, which on the one hand causes a heating of the wiper element by the cooling-medium heated up by the frictional heat of the drive motor, and on the other hand achieves a cooling off of the heated cooling-medium. In case the wall section is connected heat-conductingly to the wiper element and/or the wiper blade, it is directly in contact with the wiper element or the wiper blade. In the case of a heat-transmitting operative connection between the wall section and the wiper element and/or the wiper blade, the wiper element and/or the wiper blade is at least slightly spaced from the wall section, and the heating is done by the heat radiation of the wall section, heated up by means of the cooling-medium. The inventive solution creates thus an indirect heating of the wiper element through heat radiation or heat conduction. The wall section serves at the same time as a heat exchanger for cooling off of the heated cooling-medium and thus creates an operational portion of the cooling-medium cycle of the drive motor. Heat exchangers of the cooling-medium cycle, which heat exchangers are to be provided additionally, can be designed correspondingly weaker, thus saving energy.

In a development of the invention, the wall sections of the wiper-blade carrier are two wall surfaces, which are parallel to one another at least in sections, and which flank the wiper blade and/or the wiper element over its length on opposing sides. This achieves a uniform heating ability over the entire length of the wiper element.

The wall surfaces have, in a further development of the invention, trough-like or bead-like indentations, in which the at least one cooling-medium line is embedded. The cooling-medium line is formed preferably by an inherently stable tubing. The embedding of the tubing in the trough-like or bead-like indentations creates a good heat-conducting connection between the tubing and the wall surfaces, thus achieving a uniform and distributed heating of the wall surfaces.

The tubing is in a further development of the invention integrated at least in sections in the indentations of the wall surfaces. The tubing is preferably soldered at least in sections to the indentations of the wall surfaces. This further improves the heat-conducting connection since the solder acts as a good heat conductor. Both the wall surfaces, namely the wall sections, and also the tubing are preferably manufactured out of metal.

The wall surfaces are in a further development of the invention connected to one another by at least one connecting web. The connecting web extends preferably over an entire side length of each wall surface so that the wall surfaces and the connecting web form an inherently stable, cassette-like housing. The elastic wiper element of the wiper blade projects preferably outwardly to one open side of the housing. The wiper blade and partly the elastic wiper element are thus enclosed by the housing, thus achieving a good heat transmission or heat conduction. Due to the fact that the tubing also extends within the housing, the housing forms an insulation for the tubing; thus it is possible to improve the transfer of the heat to the wiper blade and the wiper element.

The housing has in a further development of the invention a receiving means for fastening of the wiper arm. The tubing is in a further development laid annularly in the housing and has two tube connections, which project out of the housing, preferably in the vicinity of the receiving means. This development is particularly advantageous in case the wiper arm is hingedly connected to the housing at the receiving means. Flexible cooling-medium lines can be connected to the tube connections due to the tube connections ending in the area of the receiving means, which cooling-medium lines are laid along the wiper arm up to the joint, without which the flexible cooling-medium lines or the tube connections would experience greater changes in length during swinging movements of the wiper arm due to wiping movements. A loosening of the flexible cooling-medium lines or damage of the tube connections is thus avoided. The tube connections are preferably in the direct vicinity of the swivel axis of the wiper-blade carrier in the area of the receiving means so that swiveling movements of the wiper-blade carrier relative to the wiper arm have no great influence on the flexible cooling-medium lines or the tube connections.

BRIEF DESCRIPTION OF THE DRAWINGS

Further advantages and characteristics of the invention can be taken from the claims and from the following description of a preferred exemplary embodiment of the invention, which is illustrated in the drawings, in which:

FIG. 1 is a side view of a wiper-blade carrier for an inventive windshield-wiper system, FIG. 2 is a cross-section of the wiper-blade carrier according to FIG. 1 along the cross-sectional line II-II of FIG. 1, FIG. 3 is a top view of tubing laid in the wiper-blade carrier according to FIG. 1, FIG. 4 is a side view of the tubing according to FIG. 3, and FIG. 5 is a schematic side view of the windshield-wiper system with the components according to FIGS. 1 to 4, which windshield-wiper system consists of wiper-blade carrier, wiper blade, wiper rubber and heating tubing.

DETAILED DESCRIPTION OF THE INVENTION

A windshield-wiper system, as it will be described hereinafter in greater detail in connection with FIGS. 1 to 5, is particularly preferred for use in the area of a cab of a tracked vehicle, which is utilized for grooming and designing of snow courses. The windshield-wiper system has in particular advantages where a satisfactory windshield-wiper function must be guaranteed even during extreme weather conditions. A further preferred use is provided for tracked vehicles, which are used as research or operational vehicles in snow and ice, in particular at the earth poles.

The windshield-wiper system has a wiper-blade carrier 1, in which according to FIG. 5 a wiper blade 12 is held, which carries an elastic wiper element in the form of a wiper-rubber profile 11. The wiper-blade carrier 1 is, as can be recognized in FIGS. 1 and 2, designed as a cassette-like housing. The wiper-blade carrier 1 has two side-wall surfaces 3, which are at least substantially parallel to one another, and which have a rectilinear edge at their underside and are circularly arched in their upper edge area. The two side-wall surfaces 3 are designed mirror-symmetrically to one another. The two side-wall surfaces 3 are kept at an even distance from one another by a connecting web 4, which extends at the upper edge area of the side-wall surfaces 3 transversely to said edge area and connects said side-wall surfaces with one another. The connecting web 4 is designed as a profile component arched corresponding with the upper edge area of the side-wall surfaces 3, which profile component is fixedly connected to the side-wall surfaces by several rivet connections 5 evenly distributed over the length of the side-wall surfaces 3. In place of rivet connections it is also possible to provide other integrated positive connecting means. The connecting web 4 has at its opposing ends of the wiper-blade carrier 1 each one cover plate (not identified in detail), which closes off the end areas of the cassette-like housing. The housing is open toward the underside opposite the connecting web 4, as can be recognized in FIG. 2.

The housing-like wiper-blade carrier 1 has a receiving means 2, which is arranged approximately centrally in the wiper-blade carrier 1. A mounting 10 can be positioned in the area of this receiving means 2, which mounting is associated with a wiper arm not illustrated in detail and is used to preferably releasably fasten the wiper-blade carrier 1 on the wiper arm. The wiper arm is supported swingably movably in the area of a front windshield of the cab in order to be able to carry out the respective wiping movements. Depending on the design of the entire windshield-wiper system, a further windshield-wiper system analogous to the windshield-wiper system according to FIGS. 1 to 5 is provided, which can be positioned on the front windshield laterally offset at the level of an area for a passenger.

The wiper-blade carrier 1 has in addition two retaining plates 6 in order to be able to receive the wiper blade 12 in the wiper-blade carrier 1 and to fasten it there. Fastening means 13 (not illustrated in detail) secure the wiper blade 12 on the retaining plates 6. The wiper blade 12 carries the wiper-rubber profile 11, which extends over almost the entire length of the wiper-blade carrier 1, as can be seen in FIG. 5. The wiper-rubber profile 11 has on its underside a wiper lip (not identified in detail) which rests in the operating state on the front windshield of the cab. The wiper blade 12 has several flexible support sections in order to be able to elastically flexibly hold the wiper-rubber profile 11. The wiper-rubber profile 11 is narrower than the spacing between the lower edge areas of the side-wall surfaces 3 so that the wiper-rubber profile 11 is arranged movably relative to the wiper-blade carrier 1 in order to be able to adapt to the varying curvatures of the front windshield during a respective wiping motion. In addition, the wiper-rubber profile 11 projects downwardly beyond the lower edge areas of the side-wall surfaces 3 in order to enable the respective bending of the wiper lip during the back and forth movements of the wiper-blade carrier 1 during a windshield-wiper operation. The wiper-blade carrier 1 is manufactured out of a heat-conducting material. Both the side-wall surfaces 3 and also the connecting web 4 are for this purpose made out of sheet metal. The two side-wall surfaces 3 have over almost their entire length a continuous, bead-like or trough-like embossing 7, which forms an indentation in the respective side-wall surface 3. As can be recognized in FIG. 2, the embossings are such that the created beads are arched outwardly. An annular tubing 9 is embedded from the inside in the created indentations, which tubing is curved approximately parallel to the shape of an upper contour of the wiper blade 12. The tubing 9 has two opposing tubing areas, which are each embedded over the entire length of the beads 7 flat into said beads, and are correspondingly curved at the end areas of the beads 7, and are connected to the opposing tube section to form the annular tubing. The tubing 9 has two tube connections 8, which are angled orthogonally with respect to the tubing sections and are guided parallel to one another out of the cassette-like housing of the wiper-blade carrier 1. The connecting web 4 has for this purpose suitable openings, which are not illustrated in detail. The tubing 9 is in the illustrated exemplary embodiment fixedly connected, in particular by soldering, to the inner surfaces of the beads 7 in order to achieve in this manner a fixed connection to the side-wall surfaces 3. However, it is also possible to merely embed the tubing 9 into the beads 7 and to connect the tubing 9 only in the area of the tube connections 8 fixedly to the wiper-blade carrier 1. It is finally also possible to tie the tubing 9 to the inner surfaces of the side-wall surfaces 3 or of the beads 7 by means of several dot like connecting areas. It must be guaranteed in all cases that the tubing 9 is connected permanently and fixedly to the wiper-blade carrier 1. In order to fasten the tubing 9 in the housing-shaped wiper-blade carrier 1 it is also possible to provide retaining means and releasable or nonreleasable mechanical fastening means, like screw or rivet connections or similar ones. The tubing 9 is manufactured out of metal, preferably out of an aluminum alloy, and is connected heat-conductingly to the side-wall surfaces by being embedded flat in the beads 7.

Once in the operation-ready state, the windshield-wiper system is fastened on a corresponding wiper arm in the area of a front windshield, and the tube connections are connected to flexible or inherently stable line connections of a cooling-medium cycle of a drive motor of the tracked vehicle, the cooling-medium heated by the waste heat of the drive motor is utilized for heating the tubing line 9 and thus also the side-wall surfaces 3 and the wiper-blade carrier 1, which also causes the wiper blade 12 and the wiper-rubber profile 11 to be heated. The wiper-blade carrier 1, which consists of a heat-conducting material, serves at the same time at least to a small degree as a heat exchanger for the cooling-medium fluid of the cooling-medium cycle so that at least a heat exchanger tied into the cooling-medium cycle can be reduced in design with respect to its heat-exchange performance.

What is claimed:

1. A windshield-wiper system for a motor vehicle with a wiper-blade carrier, comprising a wiper blade held on the wiper-blade carrier, which wiper blade has an elastically flexible wiper element, and comprising a heating mechanism for the wiper blade, wherein the wiper-blade carrier has two wall sections which conduct heat, and which flank the wiper element or the wiper blade, and wherein at least one fluid heating-medium line formed of a heat-conducting material is embedded in heat-conductive contact within a bead-like indentation in one of said wall sections and protruding from an inner surface of said one of said wall sections.

2. The windshield-wiper system according to claim 1, wherein a cooling-medium line of a cooling-medium cycle of a drive motor of the motor vehicle is provided as the heating-medium line.

3. The windshield-wiper system according to claim 1, wherein said two wall sections are approximately parallel to one another having wall surfaces that flank the wiper blade over its length on opposing sides.

4. The windshield-wiper system according to claim 3, wherein said two wall sections each have a bead-like indentation, in which said heating-medium line is embedded.

5. The windshield-wiper system according to claim 4, wherein the heating-medium line is formed by an inherently stable tubing, and said tubing is integrated at least in sections in the indentations of the wall surfaces.

6. The windshield-wiper system according to claim 5, wherein the wall sections are connected to one another by at least one connecting web.

7. The windshield-wiper system according to claim 6, wherein the wall sections and the connecting web are formed by a sheet-metal construction.

8. The windshield-wiper system according to claim 6, wherein the wall sections and the at least one connecting web for the wiper blade form a cassette-like housing, whereby the elastic wiper element of the wiper blade projects outwardly to one open side of the housing.

9. The windshield-wiper system according to claim 8, wherein the housing has a receiving means for fastening of a wiper arm.

10. The windshield-wiper system according to claim 9, wherein the tubing is laid annularly in the housing and has two tube connections, which project out of the housing in the vicinity of the receiving means.

11. The windshield-wiper system according to claim 4, wherein the indentations extend at least over the length of the wiper blade along the wall surfaces.

12. A windshield-wiper system for a motor vehicle, comprising:

a wiper-blade carrier having a pair of opposing wall sections formed of a heat-conducting material, each wall section having an inner surface and an outer surface, with a longitudinal indentation formed into the inner surface of each wall section; and a wiper blade held within said wiper-blade carrier by said opposing wall sections, said wiper blade having an elastically flexible wiper element, said wiper-blade carrier further comprising a heating mechanism for said wiper blade, said heating mechanism including a heating-medium line formed of a heat-conducting material and fluidly connected to a source of heating medium, said heating-medium line being embedded in the longitudinal indentation in each wall section and protruding from the inner surface of each wall section.

\* \* \* \* \*